United States Patent

Cribbs et al.

[11] Patent Number: 6,127,484
[45] Date of Patent: Oct. 3, 2000

[54] OLEFIN POLYMERIZATION PROCESS

[75] Inventors: Leonard V. Cribbs, Hamilton; Bradley P. Etherton, Cincinnati; Mark P. Mack, West Chester; James H. Meas, Jr., Cincinnati, all of Ohio

[73] Assignee: Equistar Chemicals, LP, Houston, Tex.

[21] Appl. No.: 09/302,059

[22] Filed: Apr. 29, 1999

[51] Int. Cl.⁷ .............................. C08F 8/00; C08L 23/00; C08L 23/04
[52] U.S. Cl. ............................ 525/191; 525/240
[58] Field of Search ..................... 525/191, 240

[56] References Cited

U.S. PATENT DOCUMENTS

| | | | |
|---|---|---|---|
| 4,016,342 | 4/1977 | Wagensommer | 526/65 |
| 4,368,291 | 1/1983 | Frese et al. | 525/53 |
| 4,483,938 | 11/1984 | Rees | 502/113 |
| 5,064,802 | 11/1991 | Stevens et al. | 502/155 |
| 5,236,998 | 8/1993 | Lundeen et al. | 525/52 |
| 5,326,835 | 7/1994 | Ahvenainen et al. | 526/64 |
| 5,442,018 | 8/1995 | Cann et al. | 526/65 |
| 5,539,124 | 7/1996 | Etherton et al. | 548/402 |
| 5,554,775 | 9/1996 | Krishnamurti et al. | 556/7 |
| 5,599,761 | 2/1997 | Turner | 502/152 |
| 5,637,659 | 6/1997 | Krishnamurti et al. | 526/133 |
| 5,747,594 | 5/1998 | deGroot et al. | 525/240 |
| 5,756,611 | 5/1998 | Etherton et al. | 526/127 |
| 5,869,575 | 2/1999 | Kolthammer et al. | 525/240 |
| 6,034,165 | 3/2000 | Tomomatsu et al. | 524/451 |

*Primary Examiner*—Nathan M. Nutter
*Attorney, Agent, or Firm*—Shao Guo

[57] ABSTRACT

A multiple stage or multiple zone process for making olefin polymers is disclosed. A single-site catalyst, preferably one that contains a heteroatomic ligand, is used in the first stage or zone, and a Ziegler-Natta catalyst is used at a higher temperature in later stages or zones. A parallel multiple zone process is also described. The processes, which can be performed adiabatically, give polymers with improved thermal processing ability.

24 Claims, No Drawings

OLEFIN POLYMERIZATION PROCESS

FIELD OF THE INVENTION

The invention relates to an olefin polymerization process. More particularly, the invention relates to a multiple reaction stage or zone process that uses a single-site catalyst in a first reaction stage or zone and a Ziegler-Natta catalyst in a later reaction stage or zone. The invention also relates to olefin polymers made by the process, which have improved thermal processing ability and improved mechanical properties.

BACKGROUND OF THE INVENTION

Interest in metallocene and non-metallocene single-site catalysts (hereinafter all referred to as single-site catalysts) has continued to grow rapidly in the polyolefin industry. These catalysts are more reactive than conventional Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Unfortunately, the uniformity of the molecular weight distribution of polyolefins made with single-site catalysts reduces their thermal processing ability. It is difficult to process these polyolefins under the conditions normally used for Ziegler-Natta polymers. The lower processing ability limits the development of single-site catalyst-based polyolefins because altering process conditions often requires a large capital investment.

Another disadvantage of single-site catalysts is low thermal stability. High temperature is preferred in solution and supercritical olefin polymerization processes, particularly toward the end of the reaction, because high temperature drives the polymerization to completion and reduces the viscosity of the final product. Low viscosity is needed because the polymer is often transferred and treated to remove catalysts, residual monomers, or solvents. High temperature, however, deactivates single-site catalysts.

Furthermore, single-site catalysts usually need a large amount of an alumoxane activator. The alumoxane complicates the olefin polymerization process and leaves high aluminum residues if not removed from the polymer. An important disadvantage of alumoxanes is that the large amounts typically present deactivate Ziegler-Natta catalysts that are used after or simultaneously with a single-site catalyst in an olefin polymerization.

A method for improving thermal processing ability of polyolefins is known: U.S. Pat. No. 5,236,998 discloses a parallel multiple reactor process for producing a blend of polyethylene and a copolymer of ethylene and a long-chain α-olefin using a Ziegler-Natta catalyst. The polymer blend has a broad molecular weight distribution, and therefore, it has improved thermal processing ability. U.S. Pat. No. 5,747,594 discloses a two-stage polymerization process. In a first reactor, ethylene and an α-olefin are polymerized with a metallocene catalyst. The polymerization continues in a second reactor with a Ziegler-Natta catalyst. An alumoxane activator is used in the first reactor. However, we have found that using an alumoxane activator with a single-site catalyst in the first reactor can kill a Ziegler-Natta catalyst in the second reactor, particularly when a highly reactive, thermally stable Ziegler-Natta catalyst (for example, a mixture of $VOCl_3$ and $TiCl_4$) is used.

Improved olefin polymerization processes are needed. A valuable process would sidestep the thermal stability problems of single-site catalysts and would avoid alumoxane activators. An ideal process would give olefin polymers with both good physical properties and excellent processing ability.

SUMMARY OF THE INVENTION

The invention is a process for making olefin polymers, particularly ethylene polymers that have improved thermal processing ability. The invention actually includes three processes: (1) a multiple stage process, (2) a sequential multiple zone process, and (3) a parallel multiple zone process. In a first stage or zone, an olefin is polymerized with a single-site catalyst, preferably one that contains a heteroatomic ligand, in the presence of a non-alumoxane activator at a temperature within the range of about 130° C. to about 200° C. In a second stage or zone, the polymerization is performed in the presence of a Ziegler-Natta catalyst at a higher temperature within the range of about 140° C. to about 280° C. In the multiple stage and sequential multiple zone processes, the polymerization terminates after the second stage or zone. In the parallel multiple zone process, the polymers made in the first and the second zones are transferred into a third reactor where the polymerization continues, optionally in the presence of a Ziegler-Natta catalyst.

We surprisingly found that alumoxane compounds, which are common activators for single-site catalysts, cannot be used in multiple stage or multiple zone olefin polymerizations in which a Ziegler-Natta catalyst is used in a later stage or zone because the alumoxane deactivates many Ziegler-Natta catalysts. Moreover, the resulting olefin polymers generally have undesirably low molecular weights.

Polyolefins made by the process of the invention have improved thermal processing ability as indicated by the melt flow index, $MI_2$, and the density. The final polymer of the process has a density less than about 0.98 g/mL and $MI_2$ within the range of about 0.5 to about 300 dg/min.

DETAILED DESCRIPTION OF THE INVENTION

One process of the invention is a multiple stage process for making olefin polymers, which is conveniently performed in a single reactor. In a first stage, an olefin is polymerized with a single-site catalyst in a reactor in the presence of a non-alumoxane activator. The polymerization is performed at a temperature within the range of about 130° C. to about 200° C. The resulting polymer has a weight average molecular weight (Mw) within the range of about 5,000 to about 500,000. The polymerization continues in a second stage by adding a Ziegler-Natta catalyst and additional olefin to the reactor at a higher temperature within the range of about 140° C. to about 280° C. The final polymer has a density less than about 0.98 g/mL and $MI_2$ within the range of about 0.5 to about 300 dg/min.

The invention includes a sequential multiple reaction zone process, in which each zone could be in a separate reactor. In a first zone, an olefin is polymerized with a single-site catalyst in the presence of a non-alumoxane activator. The temperature of the first zone is within the range of about 130° C. to about 200° C. The resulting first polymer has Mw within the range of about 5,000 to about 500,000. The first polymer is then transferred to a second reaction zone. The polymerization continues in the second zone at a higher temperature within the range of about 140° C. to about 280° C. in the presence of a Ziegler-Natta catalyst and additional olefin. The final polymer has a density less than about 0.98 g/mL and $Ml_2$ within the range of about 0.5 to about 300 dg/min.

The invention also includes a parallel multiple reaction zone process. A first and second reaction zone are parallel to each other, i.e., the reaction mixtures are kept separate, and a third zone is used to merge the reaction mixtures as taught by U.S. Pat. No. 5,236,998, the teachings of which are incorporated herein by reference. In the first reaction zone, a first olefin is polymerized with a single-site catalyst in the presence of a non-alumoxane activator at a temperature within the range of about 130° C. to about 200° C. The resulting first polymer has Mw within the range of about 5,000 to about 500,000. A second olefin is polymerized in the second reaction zone with a Ziegler-Natta catalyst at a temperature within the range of about 140° C. to about 280° C. The first and second olefins can be the same or different. The resulting second polymer has Mw within the range of about 20,000 to about 500,000. The first and second polymers are combined and mixed in the third zone. Polymerization continues in the third zone, optionally in the presence of a third olefin which can be the same as or different from the first or second olefin. A Ziegler-Natta catalyst can be added to the third zone if there is not enough catalyst carried over from the previous zones to continue the polymerization. The polymerization in the third zone is performed at a temperature within the range of about 140° C. to about 280° C. The final polymer has a density less than about 0.98 g/mL and $Ml_2$ within the range of about 0.5 to about 300 dg/min.

Suitable olefins for use in each process of the invention are $C_2$–$C_{20}$ α-olefins, including ethylene, propylene, 1-butene, 1-pentene, 1-hexene, 1-octene, and mixtures thereof. Ethylene is preferred. Particularly, a mixture of ethylene with up to 40 wt. % of a higher ($C_5$–$C_{20}$) α-olefin, for example, 1-hexene or 1-octene, is more preferred. Incorporating a higher α-olefin into polyethylene improves properties. The higher α-olefin, when used, is preferably introduced in the first stage or zone where a single-site catalyst is present. An advantage of the invention is improved incorporation of higher α-olefins into the high molecular weight part of the molecular weight distribution of ethylene polymers by using a single-site catalyst in the first stage or zone.

In each process of the invention, a single-site catalyst is used in the first stage or zone. By "single-site," we mean all of the metallocene and non-metallocene single-site catalysts now known. In particular, single-site catalysts are transition metal catalysts that are distinct chemical species rather than mixtures of different species. Single-site catalysts typically give polyolefins with characteristically narrow molecular weight distributions (Mw/Mn<3), uniform comonomer incorporation, and high melt indices ($Ml_2$>1.0) compared with polyolefins that are readily accessible with Ziegler-Natta catalysts. Suitable single-site catalysts for the first stage or zone comprise, for example, transition metal complexes with neutral or anionic ligands. The transition metals are in Groups 3–10 of the Periodic Table. The total number of anionic or neutral ligands satisfies the valence of the transition metal. Suitable ligands are, for example, substituted or unsubstituted cyclopentadienyls, borabenzenes, indenyls, fluorenyls, halide, alkyl, dialkylamino, siloxy, alkoxy, pyrrolyl, indolyl, carbazoyl, quinolinyl, pyridinyl, and azaborolinyl groups, or the like, and mixtures of these. Preferred catalysts contain a heteroatomic ligand such as borabenzene, pyrrolyl, quinolinyl, pyridinyl, azaborolinyl, or the like. Examples of suitable catalysts are bis (cyclopentadienyl)titanium dichloride, bis (cyclopentadienyl)zirconium dichloride, bis(1,2-dimethylcyclopentadienyl)zirconium dichloride, bis(n-butylcyclopentadienyl)zirconium dichloride, bis(indenyl) zirconium dichloride, ansa-dimethylsilyl-bis (cyclopentadienyl)zirconium dichloride, ansa-dimethylsilyl-bis(indenyl)zirconium dimethyl, bis(1-methylboratabenzene)zirconium dichloride, bis(1-methylboratabenzene)titanium dichloride, (cyclopentadienyl)(1-methylboratabenzene)zirconium dichloride, and the like. Others appear in U.S. Pat. Nos. 5,756,611, 5,637,659, 5,554,775, and 5,539,124, and their teachings are incorporated herein by reference.

Alumoxane compounds such as methyl alumoxane or ethyl alumoxane are not suitable activators for the process of the invention. When an alumoxane activator is used with the single-site catalyst, the alumoxane deactivates the Ziegler-Natta catalyst in a later stage or zone of the process. The resulting polymers have undesirably low molecular weight.

Suitable non-alumoxane activators for the single-site catalysts include alkyl aluminums, alkyl aluminum halides, anionic compounds of boron or aluminum, trialkylboron and triarylboron compounds, and the like. Examples are triethylaluminum, trimethylaluminum, diethylaluminum chloride, lithium tetrakis(pentafluorophenyl) borate, triphenylcarbenium tetrakis(pentafluorophenyl) borate, lithium tetrakis(pentafluorophenyl) aluminate, tris (pentafluorophenyl) boron, tris(pentabromophenyl) boron, and the like. Other suitable activators are known, for example, in U.S. Pat. Nos. 5,756,611, 5,064,802, and 5,599,761, and their teachings are incorporated herein by reference.

Activators are generally used in an amount within the range of about 0.01 to about 100,000, preferably from about 0.1 to about 1,000, and most preferably from about 0.5 to about 50, moles per mole of the single-site catalyst.

A Ziegler-Natta catalyst is used in the second stage or zone or third zone of each process of the invention. Preferred Ziegler-Natta catalysts are those with high thermal stability. They include titanium halides, titanium alkoxides, vanadium halides, and mixtures thereof, especially, $TiCl_3$, $TiCl_4$, mixtures of $VOCl_3$ with $TiCl_4$, and mixtures of $VCl_4$ with $TiCl_4$. Suitable Ziegler-Natta catalysts also include magnesium chloride-supported $TiCl_3$, aluminum chloride-supported mixtures of $VCl_4$ with $TiCl_4$, and the like. Other suitable Ziegler-Natta catalysts appear in U.S. Pat. No. 4,483,938, the teachings of which are incorporated herein by reference, and in Eur. Pat. 222,504.

Suitable activators for Ziegler-Natta catalysts include trialkylaluminum compounds and dialkylaluminum halides such as triethylaluminum, trimethylaluminum, diethyl aluminum chloride, and the like. These activators are generally used in an amount within the range of about 1:100 to about 100:1 moles per mole of the Ziegler-Natta catalyst.

In each process of the invention, relatively low reaction temperatures are preferred for the first stage or zone because the single-site catalyst has high reactivity even at a low temperature and, furthermore, high temperature deactivates this catalyst. The temperature in the first stage or zone is preferably in the range of about 130° C. to about 200° C., more preferably from about 130° C. to about 180° C., and most preferably from about 130° C. to about 150° C.

In the second stage or zone, or third zone, increased temperatures are used because Ziegler-Natta catalysts have low reactivity at low temperatures and are more thermally stable than single-site catalysts. The temperatures for the second stage or zone, or third zone, are preferably within the range of about 140° C. to about 280° C., more preferably from about 180° C. to about 270° C., and most preferably from about 200° C. to about 260° C.

The process of the invention can be performed at essentially constant temperature in each stage or zone by heating or cooling. Preferably, however, it is performed adiabatically. In one adiabatic process, an olefin is first heated in a reactor to a desired reaction temperature, and a catalyst solution is then injected into the reactor to start the polymerization. The polymerization heat is not removed, and the temperature rises during the course of polymerization. An advantage of the adiabatic process is that the high temperature at the end of process drives the polymerization toward completion and reduces the viscosity of the final product. Low viscosity makes product recovery easier.

The polymerization is preferably conducted under pressure. The pressure is preferably in the range of about 150 to about 5,000 psi, more preferably from about 500 to about 3,000 psi, and most preferably from about 1,000 to about 2,000 psi. Generally, the higher the pressure, the more productive the process.

The process of the invention includes solution and supercritical polymerizations. Solution polymerization is preferred because it is easily controlled and it improves incorporation of higher α-olefins into polyethylene. Saturated aliphatic and aromatic hydrocarbons are suitable solvents. It is desirable to use a solvent having a boiling point in the range of about 30° C. to about 150° C. Solvents of lower boiling point create high pressure in the reaction zone, while high-boiling solvents are difficult to remove at the end of the process. Suitable solvents include pentane, hexane, heptane, octane, toluene, xylene, and cyclohexane, and mixtures thereof such as Isopar® G solvent (product of Exxon Chemical Company).

Chain transfer agents such as hydrogen can optionally be used to control the molecular weight of the product produced in any of the stages or zones. The proportion of hydrogen used in any stage or zone can be varied. For example, if less hydrogen is used, a higher molecular weight polymer will be produced.

Olefin polymers made by the process include polyethylene, polypropylene, polybutene, ethylene/propylene copolymers, ethylene/hexene copolymers, ethylene/octene copolymers, and the like. Particularly, the invention produces ethylene polymers with improved thermal processing ability. These polymers are widely used in the industry for making polyolefin films, sheets, molded parts, and other products. The olefin polymers have improved thermal processing ability as indicated by the melt flow index, $MI_2$, which ranges from about 0.5 to about 300 decigrams per minute (dg/min), preferably from about 1 to about 100 dg/min. In addition, the polymers have densities less than about 0.98 g/mL, preferably less than about 0.97 g/mL.

While each process of the invention can produce polyolefins with improved thermal processing ability, each one has particular advantages. The multiple stage process, for example, can be practiced conveniently using a single reactor. Usually, however, this reactor must be cleaned out well between batches because residual Ziegler-Natta catalyst can adversely impact the performance of a single-site catalyst.

The sequential and parallel multiple zone processes offer the advantage of separate reaction zones. These processes can operate either batchwise or continuously, and they offer great latitude in the kinds of polyolefin products made because the two catalyst types are used in different reaction zones.

The parallel multiple zone process adds the advantage of zero contamination of reaction zones by either of the other catalysts. At least one zone has only a single-site catalyst, and at least one other zone has only a Ziegler-Natta catalyst; mixing of reaction products occurs in a third zone only.

The following examples merely illustrate the invention. Those skilled in the art will recognize many variations that are within the spirit of the invention and scope of the claims.

EXAMPLES 1–7

Two-Stage Process Using a Single-Site Catalyst in Stage I and Ziegler-Natta Catalyst A in Stage II

Example 1

Stage I: A two-liter, stainless-steel reactor is charged with dry, oxygen-free Isopar® G solvent (1000 mL, from Exxon Chemical Company). The reactor contents are heated to 140° C. Single-site catalyst, ansa-dimethylsilyl-bis(indenyl) zirconium dimethyl (0.05 mmole), is mixed with triphenylcarbenium tetrakis(pentafluorophenyl) borate in a ratio of B/Zr=1.1:1.0, and the mixture is diluted with toluene to 20 mL. After 5 minutes of mixing, the catalyst mixture is loaded into an injector. The reactor is pressurized with 150 psig of ethylene, and TEAL (triethylaluminum, 0.05 mmole in 20 mL of Isopar® G solvent) is added to the reactor as a scavenger. The catalyst solution is then injected. The polymerization starts immediately. Ethylene is supplied on demand to maintain the reactor pressure at 150 psig. The polymerization continues for 10 minutes, and then the ethylene supply is discontinued.

Stage II: Catalyst A (a mixture of 80% $VOCl_3$ and 20% $TiCl_4$, 0.05 mmole total) is combined with TEAL (0.1 mmole), and the mixture is diluted to 20 mL with Isopar® G solvent. After 5 minutes of mixing, the catalyst mixture is loaded into an injector. The reactor contents are heated to 147° C., and the reactor is repressurized with 150 psig of ethylene. The catalyst solution is then injected. The polymerization continues at 150 psig of ethylene pressure for another 10 minutes. The ethylene is vented to stop the polymerization. The reactor contents are then transferred under $N_2$ into a vessel containing about 1000 ppm of BHT (2,6-di-tert-butyl-4-methylphenol) in 1L of Isopar® G solvent and cooled to 25° C. overnight. The polymer (38.0 g) is collected and dried. This amount of polymer corresponds to a productivity of 5.51 kg of polymer per gram of transition metal.

Calculation of $Ml_2$ and Density from Measured GPC Data

In all of the following examples, the number average (Mn) and weight average (Mw) molecular weight and molecular weight distribution (Mw/Mn) of the polymer is measured by gel permeation chromatography (GPC). The data are collected on a Waters 150C chromatograph using 1,3,5-trichlorobenzene at 145° C.

The values for melt index ($Ml_2$) shown in Table 1 are calculated using the following equation: $\log(Ml_2)=20.48-3.976 \log(Mw)$. This equation provides a reasonable estimate of the $Ml_2$ of linear polyethylenes over a range of molecular weight distributions. ($Ml_2$ is the melt index of the polymer as measured according to ASTM D-1238, Condition E.)

The values for density shown in Table 1 are calculated by: density $(g/mL)=1.00\chi+0.85(1-\chi)$ where $\chi$=fraction of crystallinity in a linear polymer of weight average molecular weight Mw. Data relating crystallinity to Mw is taken from L. Mandelkern, *Macromolecules*, 5 (1972), 147. This equation provides a good estimate for the density because no higher $\alpha$-olefins are present during the polymerizations, and the polymers are linear.

EXAMPLES 2–7

The procedure of Example 1 is repeated, but the reaction temperatures in either Stage I, Stage II, or both are varied. The results are listed in the Table 1.

Catalyst B Preparation

Catalyst B is prepared using the general techniques described in U.S. Pat. No. 4,511,669 as follows. Butyl ethyl magnesium (5.0 kg of a 10.5 wt. % solution in heptane, product of Akzo-Nobel Chemicals) is placed in a 5-gallon jacketed reactor with good temperature control. While stirring at 25° C., triethylaluminum (TEAL, 1.52 L of a 24.8 wt. % solution in heptane, product of Akzo-Nobel Chemicals) is added over 10 min. The addition cylinder is flushed with hexane (180 mL) to ensure complete transfer. The reaction mixture is stirred for 1 h. The reactor is then heated to 50° C., and ethyl alcohol (2.98 L of a 2.0 M solution in hexane) is added over 50 min. The reactor is stirred for 2 h at 50° C. after the addition is complete. Poly(methylhydrosiloxane) (4.46 L of a 2.0 M solution in hexane, product of Huls Chemicals) is added over 75 min. The reactor is stirred for 2 h at 50° C. after the addition is complete. Ethyl aluminum dichloride (7.56 kg of a 19.98 wt. % solution in hexane, product of Akzo-Nobel Chemicals) is then added over 75 min. The reactor is stirred for 2 h at 50° C. after the addition is complete. Tetraisopropyltitanate (TiPT, 1.49 L of a 0.20 M solution in hexane, product of DuPont Chemical Co.) is added over 20 min. at 50° C. After the addition is complete, the TiPT cylinder is flushed with hexane (180 mL). The reactor is stirred for 2 h at 50° C. after the addition is complete. The reactor is then cooled to 30° C. Tri-n-octylaluminum in heptane (2.59 L of solution that contains 1.86 wt. % aluminum, product of Akzo-Nobel Chemicals) is added over 1 h. The reactor is stirred for 1 h at 30° C. after the addition is complete. The finished catalyst has a titanium concentration of about 0.013 M.

EXAMPLES 8–9

Two-Stage Process Using a Single-Site Catalyst in Stage I and Ziegler-Natta Catalyst B in Stage II The procedure of Example 1 is repeated, but Ziegler-Natta Catalyst B (0.025 mmole), instead of Catalyst A is used, and the reaction temperatures in either Stage I, Stage II, or both are varied. The results are listed in Table 1.

TABLE 1

Two-Stage Polymerization Process

| | Catalyst | | Temp., ° C. | | Cat. | Polymer Properties | | | |
|---|---|---|---|---|---|---|---|---|---|
| Ex. No. | Stage I | Stage II | Stage I | Stage II | Prod. kg/g | Mw × $10^{-3}$ | Mw/Mn | $Ml_2$ | Density (g/mL) |
| 1 | SSC | A | 140 | 147 | 5.51 | ND | ND | ND | ND |
| 2 | SSC | A | 140 | 165 | 13.4 | 108 | 6.2 | 3 | 0.962 |
| 3 | SSC | A | 140 | 240 | 8.82 | 29 | 3.8 | 550 | 0.979 |
| 4 | SSC | A | 180 | 188 | 8.08 | 120 | 5.8 | 2 | 0.955 |
| 5 | SSC | A | 180 | 240 | 5.08 | 64 | 6.4 | 24 | 0.974 |
| 6 | SSC | A | 200 | 200 | 7.22 | 77 | 12.0 | 11 | 0.973 |
| 7 | SSC | A | 220 | 227 | 2.10 | 58 | 13.3 | 35 | 0.976 |

TABLE 1-continued

Two-Stage Polymerization Process

| Ex. No. | Catalyst Stage I | Catalyst Stage II | Temp., °C. Stage I | Temp., °C. Stage II | Cat. Prod. kg/g | Polymer Properties Mw × $10^{-3}$ | Mw/Mn | $MI_2$ | Density (g/mL) |
|---|---|---|---|---|---|---|---|---|---|
| 8 | SSC | B | 140 | 240 | 9.39 | 32 | 3.9 | 370 | 0.979 |
| 9 | SSC | B | 180 | 240 | 3.71 | 78 | 6.0 | 11 | 0.973 |

N.D. = not determined.
SSC = ansa-dimethylsilyl-bis(indenyl)zirconium dimethyl

COMPARATIVE EXAMPLES 10–13

One-Stage Process with Ziegler-Natta Catalyst A

Comparative Example 10

A two-liter, stainless-steel reactor is charged with dry, oxygen-free Isopar® G solvent (1000 mL), and the reactor is heated to 140° C. Catalyst A (0.05 mmole) is combined with TEAL (0.1 mmole), and the mixture is diluted to 20 mL with Isopar® G solvent. After 5 minutes of mixing, the catalyst mixture is loaded into an injector. The reactor is pressurized with 150 psig of ethylene, and then the catalyst solution is injected. The polymerization starts immediately, and ethylene is supplied on demand to maintain the reactor pressure at 150 psig. The polymerization continues for 10 minutes, and the ethylene supply is then discontinued. The reactor contents are transferred under $N_2$ into a vessel containing about 1000 ppm of BHT in 1L of Isopar® G solvent, and the mixture cools to 25° C. overnight. The polymer (22.4 g) is dried and collected. Catalyst productivity is 8.9 kg of polymer per gram of transition metal. Melt index is measured according to ASTM D-1238, Condition E and Condition F. (An actual measurement rather than a calculation, as is used for Examples 1–9.) $MI_2$ is the melt index measured with a 2.16 kg weight (Condition E). The high-load melt index (HLMI) is the melt index measured with a 21.6 kg weight (Condition F). The melt flow ratio (MFR) is the ratio of HLMI to $MI_2$ and is an indication of the molecular weight distribution. The polymer has Mw: 257,000, Mw/Mn: 6.1, $MI_2$: 0.01 dg/min, and MFR: 83.

COMPARATIVE EXAMPLES 11–13

The procedure of Comparative Example 10 is repeated, but the reactor contents are heated to the desired reaction temperature prior to injecting the catalyst. Reaction temperatures, catalyst productivities, and polymer properties are listed in Table 2.

COMPARATIVE EXAMPLES 14–17

One-Stage Process with Ziegler-Natta Catalyst B

Comparative Example 14

The polymerization of Comparative Example 10 is repeated, but Catalyst B (0.025 mmole) is used instead of Catalyst A. The polymer (36.5 g) is collected. Catalyst productivity: 29.0 kg of polymer per gram of transition metal. The polymer has Mw: 158,000, Mw/Mn: 4.2, $MI_2$: 0.15 dg/min, and MFR: 69.

COMPARATIVE EXAMPLES 15–17

The procedure in Comparative Example 14 is repeated, but the reaction temperature is varied. The results are listed in Table 2.

COMPARATIVE EXAMPLES 18–21

One-Stage Process with Single Site Catalyst

COMPARATIVE EXAMPLE 18

The procedure of Comparative Example 10 is repeated, but a single-site catalyst, ansa-dimethylsilyl-bis(indenyl) zirconium dimethyl, (0.049 mmole), is used instead of Catalyst A. The catalyst is mixed with triphenylcarbenium tetrakis- (pentafluorophenyl) borate in a ratio of B/Zr= 1.1:1.0, and the mixture is diluted with toluene to 20 mL. TEAL (0.05 mmole in 20 mL of Isopar® G solvent) is introduced into the reactor as a scavenger before the catalyst mixture is injected. The polymer (55.2 g) is collected. Catalyst productivity: 22.4 kg of polymer per gram of transition metal. The polymer has Mw: 27,000, Mw/Mn: 3.4, and $MI_2$: 280 dg/min.

COMPARATIVE EXAMPLES 19–21

The procedure of Comparative Example 18 is repeated, but the reaction temperature is varied. The results are listed in Table 2.

TABLE 2

Comparative One-Stage Polymerization Process

| Ex. No. | Catalyst | Temp. °C. | Prod., kg/g | Polymer Properties Mw × $10^{-3}$ | Mw/Mn | $MI_2$ | MFR |
|---|---|---|---|---|---|---|---|
| C10 | A | 140 | 8.9 | 257 | 6.1 | 0.01 | 83 |
| C11 | A | 180 | 7.1 | 190 | 6.9 | 0.03 | 62 |
| C12 | A | 220 | 10.0 | 89 | 4.8 | N.D. | N.D. |
| C13 | A | 240 | 6.3 | 77 | 4.8 | 4.1 | 41 |
| C14 | B | 140 | 29.0 | 158 | 4.2 | 0.15 | 69 |
| C15 | B | 180 | 42.6 | 108 | 5.2 | 1.0 | 51 |
| C16 | B | 220 | 33.1 | 60 | 4.6 | 10.4 | 32 |
| C17 | B | 240 | 18.5 | 43 | 3.4 | 51.2 | 39 |
| C18 | SSC | 140 | 22.4 | 27 | 3.4 | 280 | N.D. |
| C19 | SSC | 180 | 21.7 | 9 | 2.9 | >2000 | N.D. |
| C20 | SSC | 220 | 4.8 | 11 | 3.5 | >2000 | N.D. |
| C21 | SSC | 240 | 2.8 | 11 | 4.8 | >2000 | N.D. |

N.D. = not determined.
SSC = ansa-dimethylsilyl-bis(indenyl)zirconium dimethyl

EXAMPLE 22

Sequential Multiple Zone Process

In a first two-liter, stainless-steel reactor, 1000 mL of oxygen-free Isopar® G solvent and 40 grams of octene are introduced. The reactor is heated to 140° C., and enough ethylene is added to bring the reactor pressure to 150 psig. Bis(methylborabenzene) zirconium dimethyl (0.05 mmole, prepared according to U.S. Pat. No. 5,554,775) is mixed with 0.055 mmole of tri(n-butyl)ammonium tetrakis (pentafluorophenyl) borate (prepared according to U.S. Pat. No. 5,599,761). The mixture is diluted with toluene to 20 mL, and is loaded into an injector. The catalyst solution is then injected into the reactor to start the polymerization. Ethylene supply continues to maintain the reactor pressure at 150 psig. The polymerization is carried out for 10 minutes, and the ethylene supply is discontinued. The reactor is sampled to measure the properties of the first polymer, which is expected to have a Mw within the range of about 50,000 to about 200,000, and to contain about 2 to about 10 wt. % of octene monomeric units.

In a second two-liter, stainless-steel reactor, 0.05 mmole of Catalyst A is introduced along with triethylaluminum (TEAL, 0.1 mmole). The first polymer is transferred to the second reactor. The polymerization continues by adding additional ethylene to maintain the reactor pressure at 150 psig. The polymerization is carried out at 200° C. for 10 minutes. Calcium stearate (1000 ppm) is added to terminate the polymerization, and the product is then transferred under $N_2$ into a vessel containing 250 ppm of Irganox™ 1010 antioxidant (product of Ciba-Geigy) and cooled to 25° C. The final polymer is dried and collected. It is expected to have a density less than 0.98 g/mL and $MI_2$ within the range of about 0.5 to about 300 dg/min.

EXAMPLE 23

Parallel Multiple Zone Process

In a first two-liter, stainless-steel reactor, 1000 mL of oxygen-free Isopar® G solvent and 40 grams of octene are introduced. The reactor is heated to 140° C., and enough ethylene is added to bring the reactor pressure to 150 psig. Bis(methylborabenzene) zirconium dimethyl (0.05 mmole, prepared according to U.S. Pat. No. 5,554,775) is mixed with 0.055 mmole of tri(n-butyl)ammonium tetrakis (pentafluorophenyl) borate activator (prepared according to U.S. Pat. No. 5,599,761). The mixture is diluted with toluene to 20 mL, and is loaded into an injector. The catalyst solution is then injected into the reactor to start the polymerization. Ethylene supply continues to maintain the reactor pressure at 150 psig. The polymerization is carried out for 10 minutes, and the ethylene supply is then discontinued. The reactor is sampled to measure the properties of the first polymer, which is expected to have a Mw in the range of about 50,000 to about 200,000, and to contain about 2 to about 10 wt. % of octene monomeric units.

In a second two-liter, stainless-steel reactor, which is parallel to the first reactor (set-up as taught in U.S. Pat. No. 5,236,998), 1000 mL of Isopar® G solvent, 0.05 mmole of Catalyst A, and 0.1 mmole of TEAL are introduced. Ethylene is added to bring the reactor pressure to 150 psig. The reactor contents are heated to 200° C., and the polymerization is carried out at this temperature for 10 minutes. The reactor is sampled. The second polymer (from the second reactor) is expected to have a Mw within the range of about 100,000 to about 250,000.

The first and the second polymers are transferred to a third reactor. The reactor contents are mixed well and heated to 200° C. Ethylene is added to bring the pressure to 150 psig. Catalyst A (0.050 mmole), and 0.1 mmole of triethylaluminum are introduced to the reactor. The polymerization continues for 10 minutes at 200° C. Calcium stearate (1000 ppm) is then added to terminate the polymerization. The final product is transferred under $N_2$ into a vessel containing 250 ppm of Irganox™ 1010 antioxidant and cooled to 25° C. The final polymer is dried and collected. It is expected to have a density less than 0.98 g/mL and $MI_2$ within the range of about 0.5 to about 300 dg/min.

The preceding examples are meant only as illustrations; the following claims define the scope of the invention.

We claim:

1. A multiple zone process which comprises:
   (a) polymerizing an olefin in a first reaction zone with a single-site catalyst in the presence of a non-alumoxane activator at a temperature within the range of about 130° C. to about 200° C. to produce a first polymer having a weight average molecular weight (Mw) within the range of about 5,000 to about 500,000; and
   (b) transferring the first polymer to a second reaction zone at a higher temperature within the range of about 140° C. to about 280° C. with additional olefin in the presence of a Ziegler-Natta catalyst to produce a final polymer composition having a density less than about 0.98 g/mL and $MI_2$ within the range of about 0.5 to about 300 dg/min.

2. The process of claim 1 wherein the temperature of the first reaction zone is within the range of about 130° C. to about 150° C.

3. An adiabatic process of claim 1.

4. A solution polymerization process of claim 1.

5. The process of claim 1 wherein the olefin is selected from the group consisting of ethylene, propylene, 1-butene, 1-pentene, 1-hexene, 1-octene, and mixtures thereof.

6. The process of claim 1 wherein the olefin is ethylene.

7. The process of claim 1 wherein the single-site catalyst contains a heteroatomic ligand selected the group consisting of boraaryl, azaborolinyl, pyridinyl, pyrrolyl, and quinolinyl.

8. The process of claim 1 wherein the non-alumoxane activator is selected from the group consisting of alkyl aluminums, alkyl aluminum halides, anionic compounds of boron or aluminum, trialkylboron compounds, and triarylboron compounds.

9. The process of claim 1 wherein the Ziegler-Natta catalyst is selected from the group consisting of titanium halides, titanium alkoxides, vanadium halides, and mixtures thereof.

10. The process of claim 1 wherein the process is performed at a pressure within the range of about 500 psi to about 5,000 psi.

11. A multiple zone process which comprises:
   (a) polymerizing an olefin in a first reaction zone with a single-site catalyst that contains at least one heteroatomic ligand selected from the group consisting of boraaryl, azaborolinyl, pyridinyl, pyrrolyl, and quinolinyl, in the presence of a non-alumoxane activator at a temperature within the range of about 130° C. to about 200° C. to produce a first polymer having a weight average molecular weight (Mw) within the range of about 5,000 to about 500,000; and (b) transferring the first polymer to a second reaction zone at a higher temperature within the range of about 140° C. to about 280° C. with additional olefin in the presence of a Ziegler-Natta catalyst to produce a final polymer composition having a density less than about 0.98 g/mL and $Ml_2$ within the range of about 0.5 to about 300 dg/min.

12. A multiple stage process which comprises:

(a) in a first stage, polymerizing an olefin with a single-site catalyst in a reactor in the presence of a non-alumoxane activator at a temperature within the range of about 130° C. to about 200° C. to produce a first polymer having Mw within the range of about 5,000 to about 500,000; and (b) continuing polymerization in a second stage by adding a Ziegler-Natta catalyst and additional olefin to the reactor at a higher temperature within the range of about 140° C. to about 280° C. to produce a final polymer composition having a density less than about 0.98 g/mL and $Ml_2$ within the range of about 0.5 to about 300 dg/min.

13. The process of claim 12 wherein the temperature for the first stage is within the range of about 130° C. to about 150° C.

14. An adiabatic process of claim 12.

15. A solution polymerization process of claim 12.

16. The process of claim 12 wherein the olefin is selected from the group consisting of ethylene, propylene, 1-butene, 1-pentene, 1-hexene, 1-octene, and mixtures thereof.

17. The process of claim 12 wherein the olefin is ethylene.

18. The process of claim 12 wherein the single-site catalyst contains a heteroatomic ligand selected the group consisting of boraaryl, azaborolinyl, pyridinyl, pyrrolyl, and quinolinyl.

19. The process of claim 12 wherein the non-alumoxane activator is selected from the group consisting of alkyl aluminums, alkyl aluminum halides, anionic compounds of boron or aluminum, trialkylboron compounds, and triarylboron compounds.

20. The process of claim 12 wherein the Ziegler-Natta catalyst is selected from the group consisting of titanium halides, titanium alkoxides, vanadium halides, and mixtures thereof.

21. The process of claim 12 wherein the process is performed under pressure of about 500 psi to about 5,000 psi.

22. A multiple stage process which comprises:

(a) in a first stage, polymerizing an olefin with a single-site catalyst that contains at least one heteroatomic ligand selected from the group consisting of boraaryl, azaborolinyl, pyridinyl, pyrrolyl, and quinolinyl, in a reactor in the presence of a non-alumoxane activator at a temperature within the range of about 130° C. to about 200° C. to produce a first polymer having Mw within the range of about 5,000 to about 500,000; and (b) continuing polymerization in a second stage by adding a Ziegler-Natta catalyst and additional olefin to the reactor at a higher temperature within the range of about 140° C. to about 280° C. to produce a final polymer composition having a density less than about 0.98 g/mL and $Ml_2$ within the range of about 0.5 to about 300 dg/min.

23. A parallel multiple zone process which comprises:

(a) polymerizing an olefin in a first reaction zone with a single-site catalyst in the presence of a non-alumoxane activator at a temperature within the range of about 130° C. to about 200° C. to produce a first polymer having Mw within the range of about 5,000 to about 500,000;

(b) polymerizing an olefin in a second reaction zone that is parallel to the first reaction zone at a higher temperature within the range of about 140° C. to about 280° C. in the presence of a Ziegler-Natta catalyst to produce a second polymer having Mw within the range of about 20,000 to about 500,000; and (c) combining the first and second polymers in a third reaction zone to continue the polymerization at a temperature within the range of about 140° C. to about 280° C. with additional olefin in the presence of a Ziegler-Natta catalyst to produce a final polymer composition having a density less than about 0.98 g/mL and $Ml_2$ within the range of about 0.5 to about 300 dg/min.

24. A parallel multiple zone process which comprises:

(a) polymerizing an olefin in a first reaction zone with a single-site catalyst that contains at least one heteroatomic ligand selected from the group consisting of boraaryl, azaborolinyl, pyridinyl, pyrrolyl, and quinolinyl, in the presence of a non-alumoxane activator at a temperature within the range of about 130° C. to about 200° C. to produce a first polymer having Mw within the range of about 5,000 to about 500,000;

(b) polymerizing an olefin in a second reaction zone that is parallel to the first reaction zone at a higher temperature within the range of about 140° C. to about 280° C. in the presence of a Ziegler-Natta catalyst to produce a second polymer having Mw within the range of about 20,000 to about 500,000; and (c) combining the first and second polymers in a third reaction zone to continue the polymerization at a temperature within the range of about 140° C. to about 280° C. with additional olefin in the presence of a Ziegler-Natta catalyst to produce a final polymer composition having a density less than about 0.98 g/mL and $Ml_2$ within the range of about 0.5 to about 300 dg/min.

* * * * *